United States Patent Office 3,645,896
Patented Feb. 29, 1972

3,645,896
FILM FORMING HYDRAZINE-CONTAINING CORROSION INHIBITOR
Arthur L. Larsen, Denver, Colo., assignor to Marathon Oil Company, Findlay, Ohio
No Drawing. Filed Jan. 10, 1969, Ser. No. 790,485
Int. Cl. C23f 11/00
U.S. Cl. 252—8.55 D                         3 Claims

ABSTRACT OF THE DISCLOSURE

Corrosion rates in oil wells are reduced by injecting in combination from about 5 to about 200 p.p.m. of a film-forming nitrogen-containing corrosion inhibitor (e.g. an imidazoline compound) and 0.01–1.0 p.p.m. of hydrazine. Such is especially useful with water injection wells.

BACKGROUND OF THE INVENTION

This invention relates to corrosion inhibitors for oil wells, especially water-injection wells or wells producing large quantities of water, piping (conduit) systems associated with wells, systems for containing oil and/or water (identified as gathering systems), etc. Regarding wells, the corrosion inhibitor can be injected upstream, at the well head, downhole, or other suitable places.

The Encyclopedia of Chemical Technology, second edition, volume 6, pages 330–340 teaches that acid neutralizing-type inhibitors and film-forming organic-type inhibitors are useful as corrosion inhibitors. It teaches that hydrazine is known to be an effective acid neutralizing inhibitor, especially when such dissolved gases as $O_2$, $CO_2$ and $H_2S$ are present in waterflooding systems. As far as film-forming organic-type inhibitors, it teaches that fatty and heterocyclic nitrogen-containing compounds, such as the amine-acid complexes and the imidazoline derivatives, are useful.

It is generally known that film-forming, nitrogen-containing corrosion inhibitors will not function effectively in the presence of oxygen. Also, it is known that the cost of removing relatively large amounts of oxygen with hydrazine can be prohibitive.

SUMMARY OF THE INVENTION

Applicant has discovered that corrosion in the well bore can be reduced by injecting a combination of a sufficient amount of hydrazine to maintain a residual hydrazine concentration of from about 0.01 to about 1.0 p.p.m. and from about 5 to about 200 p.p.m. of a film-forming nitrogen-containing corrosion inhibitor. The term "residual" means that amount of hydrazine which can be analyzed as free hydrazine—it is postulated that some of the hydrazine may act as a sacrificial anode, the anodic reaction being:

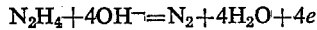

The term "residual hydrazine" does not mean that amount of hydrazine in excess of the reaction to neutralize all of the $O_2$, i.e. that in excess of the reaction:

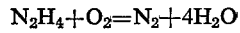

The combination of the hydrazine and the corrosion inhibitor imparts a synergistic action, such as illustrated by test results in Example I.

DESCRIPTION OF THE INVENTION

A combination of from about 5 to about 200 p.p.m., and preferably from about 10 to about 20 p.p.m., of the film-forming nitrogen-containing corrosion inhibitor and from about 0.01 to about 1.0 p.p.m., preferably from about 0.1 to about 0.5 p.p.m. of residual hydrazine are useful to give good corrosion protection with this invention. Amounts in excess of 1 p.p.m. of hydrazine are useful, but generally prove to be too costly for the results obtained. However, too much of the film-forming nitrogen containing corrosion inhibitor may cause a formation emulsion, therefore such large amounts are undesirable.

The film-forming nitrogen-containing corrosion inhibitor can be a primary amine, a secondary amine, a tertiary amine, a quaternary amine, a diamine, salts of these amines or corrosion inhibitors of like character. Generally, the amines contain an average of from about 10 to about 20 carbon atoms, however, amines containing less than 10 and more than 20 carbon atoms are useful. The salts of the amines are preferably those having water dispersible characteristics, e.g. ethylene oxide, or low molecular weight carboxylic acid condensates with the amine compound. However, if the corroding medium contains substantial amounts of hydrocarbon, the dispersible characteristics of the salts can be more oleophilic.

A particularly useful film-forming nitrogen compound is the imidazoline compound identified as:

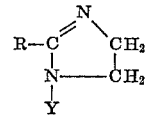

wherein R is an alkyl containing an average of from 10 to about 20 carbon atoms and Y can be H, a hydroxy alkyl substituent containing up to about 8 carbon atoms (e.g. $C_2H_4OH$), an alkyl amine-containing substituent containing up to about 8 carbon atoms, e.g. $C_2H_4NH_2$, etc. Particularly useful imidazoline containing compounds include Corban 210 WS (acetic salt of imidazoline, contains about 22–28% imidazoline, about 3–5% of acetic acid, about 1% of a dispersant and the balance isopropanol and water), and Corban 222, trade names of Dowell, a division of Dow Chemical Company, Tulsa, Okla.

It is preferred that the hydrazine be available in a safe condition, i.e. diluted with water, however, anhydrous, as well as hydrous solutions of hydrazine are useful. The hydrazine is present in relatively small amounts, i.e. up to about 1.0 p.p.m. of residual hydrazine. This amount is substantially less than the molecular equivalent of the oxygen generally present in the corroding medium.

The film-forming nitrogen-containing corrosion inhibitor and the hydrazine necessarily do not react. The combination however, produces a synergistic effect which reduces the amount of corrosion in the well bore or on the metal surface. Such a combination is particularly useful with a water injection well (i.e. where waterflooding process is being effected), a gas lift well (the corrosion inhibitor is injected into the gas at the well head or can be injected downhole), etc. to materially reduce corrosion in well bore casings, tubing, distribution lines, systems to contain crude oil, water or gas, etc.

The hydrazine and the film-forming nitrogen containing corrosion inhibitor may be injected separately and simultaneously, injected as a composition inhibitor, or by any other means known in the art. If the hydrazine is to be stored, it is recommended that it be diluted with water, the water is preferably free of cations which will catalyze the oxidation of hydrazine. Also, it is recommended that deionized water, a water soluble organic solvent (e.g. isopropanol) or a low molecular weight hydrocarbon (including kerosene), or combination of the above be used to dilute the film-forming nitrogen-containing corrosion inhibitor, if the latter is to be diluted.

The combination of hydrazine and the film-forming nitrogen-containing corrosion inhibitor can be injected with soft water, brine or brackish water into water injection wells.

By practicing the teachings of this invention, improved and complete corrosion control can be obtained. In some cases, corrosion rates can be misleading and in the case of an oxidizing atmosphere, pitting can result to give a severe condition even though the corrosion rate e.g. less than 20 mils per year, indicates that such a condition does not exist. For example, where pitting occurs, the corrosion can be in excess of 400 mils per year. By following the teachings of this invention, corrosion can be controlled down to less than 1 mil per year also the pitting effect discussed above can be substantially reduced or eliminated.

The following example is presented to illustrate specific working embodiments of the invention. This example is not meant to limit the invention in any way. Rather, all equivalents obvious to those skilled in the art are intended to be interpreted within the scope of the invention as defined within the specification and appended claims. Unless otherwise specified, all percents are based on volume. The corrosion rates are measured with a Pair Corrosion Meter, marketed by Petrolite Corp., St. Louis, Mo.

EXAMPLE I

The following tests illustrate the synergistic effect of the hydrazine and the film-forming nitrogen-containing corrosion inhibitor:

Test I: A water injection well characterized as having 1 to about 2 p.p.m. of dissolved oxygen in the injected water (about 300 barrels/day) is treated with an imidazoline composition (Corban 210 WS) at a concentration of 200 p.p.m. (based on imidazoline) over a period of one month. At the end of the test period, the well indicated a corrosion rate of about 20 mils per year.

Test II: The water injection well of Test I is injected only with hydrazine in the water at a residual concentration of 0.3 p.p.m. of hydrazine for one month. At the end of the test period, the well indicated a corrosion rate of about 14 mils per year.

Test III: The water injection well of Test I is injected with 0.3 p.p.m. of residual hydrazine and about 10 p.p.m. (based on imidazoline) of imidazoline compound (Corban 210 WS) over a period of one month. At the end of the test period, the well indicated a corrosion rate of about 4 mils per year.

Test III indicates that a synergistic effect of the hydrazine and the film-forming nitrogen containing corrosion inhibitor gives a reduction in corrosion rate of 4 mils per year whereas the use of hydrazine alone gave a corrosion rate of 14 mils per year and the film-forming nitrogne-containing corrosion inhibitor gave a corrosion rate of 20 mils per year.

Additives known in the art are useful with the film-forming nitrogen containing inhibitor and hydrazine.

Examples of such additives include dispersants, bactericides, corrosion inhibitors, emulsion breakers, hydrocarbon collectors, etc.

What is claimed is:

1. A method of reducing the corrosion rate in a water injection well and associated conduits and gathering systems, the method comprising injecting into the well from about 0.01 to about 1.0 p.p.m. of residual hydrazine and from about 5 to about 200 p.p.m of an imidazoline compound of the formula:

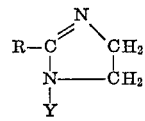

wherein R is an alkyl containing an average of from about 10 to about 20 carbon atoms and Y is H, a hydroxy alkyl substituent containing up to about 8 carbon atoms or an amino alkyl substituent containing up to about 8 carbon atoms, the p.p.m. based on the water within the injection well.

2. The method of claim 1 wherein from about 0.1 to about 0.5 p.p.m. of residual hydrazine is injected.

3. The method of claim 1 wherein from about 10 to about 20 p.p.m. of the film-forming nitrogen-containing corrosion inhibitor is injected into the well.

References Cited

UNITED STATES PATENTS

| 2,468,163 | 4/1949 | Blair et al. | 252—8.55 |
| 3,042,609 | 7/1962 | Hughes | 252—8.55 |
| 3,106,525 | 10/1963 | Schmid et al. | 252—8.55 X |
| 3,119,447 | 1/1964 | Raifsnider et al. | 252—8.55 X |
| 3,200,071 | 8/1965 | Stromberg | 252—8.55 |
| 3,445,441 | 5/1969 | Rushton | 252—8.55 X |

FOREIGN PATENTS

| 659,624 | 3/1963 | Canada | 252—8.5 |

OTHER REFERENCES

Baker et al.: Hydrazine as an Oxygen Scavenger, transactions of the ASME, February 1956, pages 299 to 303.

Encyclopedia of Chemical Technology, second edition, vol. 6, pub. 1965, by Interscience Publishers of New York, pages 330 to 333.

HERBERT B. GUYNN, Primary Examiner

U.S. Cl. X.R.

21—2.5, 2.7; 166—275; 252—8.55 E, 390, 392